Oct. 17, 1939.   H. SCHNEIDER   2,176,105
PLANETARY TURBINE TRANSMISSION
Original Filed Nov. 28, 1934
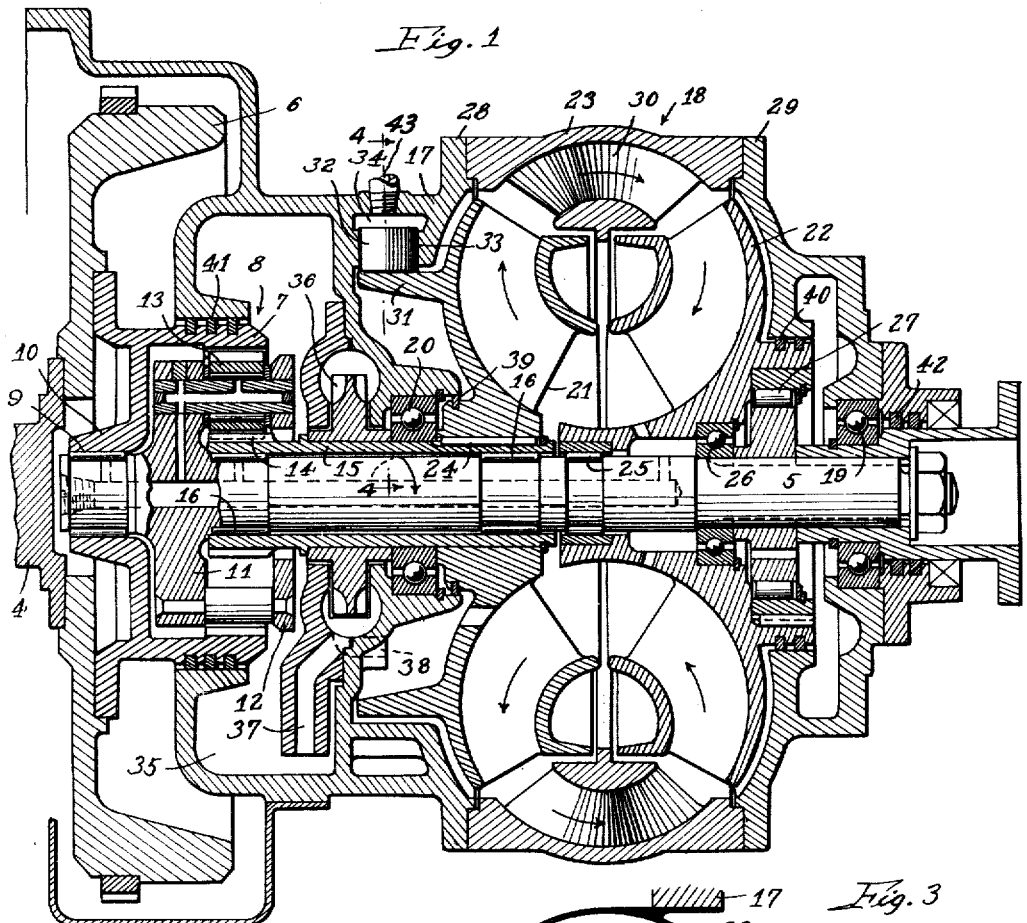
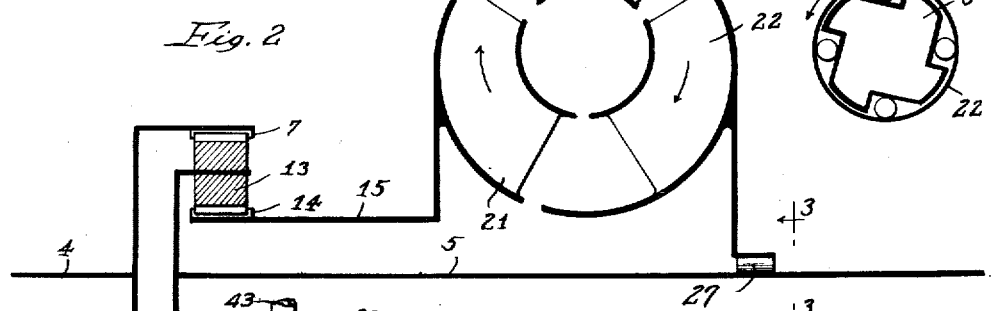
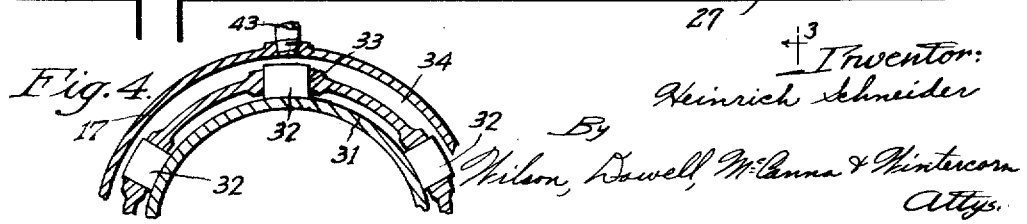
Inventor:
Heinrich Schneider
By
Wilson, Bowell, McCanna & Wintercorn
Attys.

Patented Oct. 17, 1939

2,176,105

UNITED STATES PATENT OFFICE 2,176,105

PLANETARY TURBINE TRANSMISSION

Heinrich Schneider, Beloit, Wis.

Application November 28, 1934, Serial No. 755,094
Renewed January 16, 1939

26 Claims. (Cl. 74—293)

This invention relates to hydraulic transmissions of the Föttinger turbine type, and more particularly to a new differential transmission of that type.

Hydraulic couplings and hydraulic torque converters have been proposed and used in place of step-gear transmissions and electric drives for many applications and particularly in automobiles and rail vehicles driven by internal combustion engines. An ideal drive for such vehicles must provide automatic continuous speed and torque variation over a wide range with high efficiency. However, hydraulic couplings give speed variation but no torque increase, and the torque converters afford speed variation and limited torque increase, but at the cost of efficiency. It is, therefore, the principal object of my invention to provide a differential type of hydraulic transmission of the Föttinger turbine ring type to avoid the objections mentioned and fulfill the requirement of an ideal drive.

A differential transmission consists of a primary and a secondary drive which in combination transmit the total power from the driving shaft to the driven shaft, whereby the amount of power transmitted by each of the drives may vary from zero to full power, or vice versa, the sum of the two being always equal to the full power transmitted. In accordance with the present invention, a hydraulic torque converter forms the secondary drive and is combined with planetary gears forming the primary drive. The primary drive serves to transmit the torque of the driving shaft substantially directly to the driven shaft, and the secondary drive serves to transmit power indirectly to the driven shaft. The torque converter consists of a pump impeller driven from the primary drive, a turbine wheel mounted on the driven shaft, and a substantially stationary reaction member, the latter having guide blades formed so as to cause the turbine to turn in the opposite direction from the impeller, to meet the requirements of the special combination, as later explained.

The invention is illustrated in the accompanying drawing, in which—

Figure 1 is a longitudinal section through a transmission made in accordance with my invention;

Fig. 2 is a diagram of that much of the transmission as occurs on one side of the center line;

Fig. 3 is another diagrammatic view of the overrunning clutch taken on the line 3—3 of Fig. 2, and Fig. 4 is a sectional detail on a reduced scale taken on the line 4—4 of Fig. 3.

The same reference numerals are applied to corresponding parts throughout the views.

The driving and driven shafts are numbered 4 and 5, respectively. 6 is a flywheel on the driving shaft carrying a ring gear 7 of a planetary transmission, indicated generally by the numeral 8. A pilot bearing 9 is provided in the center hub 10 of the ring gear for the front end of the driven shaft 5. A spider 11 on the shaft 5 and a ring 12 surrounding the shaft provide supports for the planetary gears 13 meshing with the ring gear 7 and sun gear 14. The latter is provided on the front end of a sleeve 15 that surrounds the shaft 5 and is supported thereon, suitably on needle bearings 16. A housing 17, behind the flywheel housing, has the driven shaft 5 extending therethrough and contains the hydraulic torque converter, indicated generally by the numeral 18. The shaft 5 and sleeve 15 are mounted in bearings 19 and 20, respectively, provided in the housing 17. The torque converter 18 comprises a pump impeller 21, a turbine wheel 22 and a reaction member 23. The impeller 21 is keyed or otherwise suitably secured to the sleeve 15, as at 24, to turn with the sun gear 14. The turbine 22 is supported on the shaft 5 suitably on a needle bearing 25 and ball-bearing 26, and is arranged to transmit drive to the shaft 5 through an overrunning or freewheeling clutch 27. The reaction member 23 is stationary, the same being in the form of a ring that is accurately located and suitably secured between the flanged 28 and 29 on the housing 17, the flange 29 being on a separate back wall for said housing.

In operation it will be assumed, to begin with, that the driven shaft 5, which may be connected with the propeller shaft of a vehicle, is at a standstill, and that the driving shaft 4 is a rotating crank shaft of an internal combustion engine or else a shaft connected with the crank shaft and rotated thereby. Under such circumstances, the sun gear 14 and pump impeller 21 are driven by the planetary gears 13 in the opposite direction and at a higher speed than the shaft 4 in accordance with the gear ratio of ring gear 7 to sun gear 14. The planetary gearing 8 constitutes what I have previously referred to as the primary drive, and the torque converter 18 is the secondary drive. The primary drive exerts a substantially direct torque reaction upon the driven shaft 5 by reason of the thrust imposed upon the planetary gears 13 in the turning of the ring gear 7 and the driving of the sun gear 14. There is an additional torque reaction imposed upon the driven shaft 5 by the turbine wheel 22 of the secondary drive, through the medium of the clutch 27. This secondary torque reaction results from fluid circulated by the pump impeller 21 driven by the sun gear 14. Owing, however, to the fact that the sun gear 14 and impeller 21 turn in the opposite direction relative to the shafts 4 and 5, the passages 30 between the blades of the reaction member 23 and establishing communication between the impeller 21 and turbine 22, must be formed to direct the fluid which they receive from the impeller so that the turbine will turn in the opposite direction with respect to the impeller. The impeller will turn at a higher speed than the turbine, and due to a difference in the centrifugal force acting on the oil or other fluid used, the oil will circulate in the direction indicated by the arrows, out through the passages in the impeller and back through the passages in the turbine. The kinetic energy of the circulating oil transmits power from the impeller to the turbine. The total torque on the driven shaft 5 is the sum of the planetary gear torque reaction of the primary drive, and the turbine torque reaction of the secondary drive. The turbine torque is a maximum when the driven shaft is at a standstill. If the speed of the driving shaft 4 is increased, that is, if the engine is speeded up, the total torque imposed upon the driven shaft increases until it overcomes its resistance and the shaft begins to turn. As soon as the resistance of the driven shaft is reduced, its speed increases and the speed of the sun gear 14 is accordingly reduced, assuming that the driving shaft is turning at a constant speed. Under the circumstances, the pump impeller 21 reduces its oil delivery and pressure, and hence the torque exerted on the driven shaft by the turbine wheel 22 is reduced. When the resistance to the turning of the driven shaft is reduced to a minimum, its speed approaches a maximum, and the speed of the sun gear 14 and pump impeller 21 approaches a minimum, and, consequently, the power transmitted to the driven shaft through the secondary drive becomes a minimum. In other words, with the present transmission, the torque and speed of the secondary drive changes automatically in response to the resistance to turning offered by the driven shaft 5. The secondary drive gives a torque increase varying with the varying torque and speed conditions of the engine and load. In addition, this secondary drive provides an easy acting clutch that is self-releasing at low engine speed. The freewheeling or overrunning clutch 27 allows the driven shaft 5 to turn faster than the turbine wheel 22 or to turn with respect thereto when said wheel is stationary, as, for example, in direct drive. The capacity of the hydraulic secondary drive 18 will be predetermined in relation to the gear ratio of the planetary primary drive 8, so that the efficiency of the secondary drive is highest over the speed and torque range most used in the particular application. The floating sun gear and pump impeller act as an automatic torque and speed control in the transmission, running at high speed when the driven shaft requires high torque. In an ordinary hydraulic coupling drive where the internal combustion engine drives the primary shaft of the coupling, the maximum speed of the engine is limited by the torque of the driven shaft, and the engine cannot be speeded up to develop full power when the vehicle is at a standstill or during the acceleration period. With the present construction, on the other hand, the engine can be speeded up even when the driven shaft is stationary because the floating sun gear and impeller unit give way and rotate at high speed to transmit the engine power to the secondary drive, where it is converted into torque applied to the driven shaft. The higher the speed of the engine under this stationary shaft condition, the higher the speed and transmitted power of the floating member. Therefore, by suitably proportioning the pump impeller, the reaction of the floating member to changes in the speed of the engine can be made of greater or less value, and by further suitable relative proportioning of the impeller and turbine wheel, the maximum torque exerted on the driven shaft, for a given engine torque can be varied as desired, or the high efficiency range of the transmission shifted toward the desired speed and torque range of the specific application for which the transmission is to be used.

The sun gear 14 is arranged to be held against turning by any suitable or preferred braking means cooperating with the flange 31 on the outside of the pump impeller 21. In the present disclosure I have provided a series of brake shoes 32 in circumferentially spaced relation, only one of which appears in Fig. 1. These are in the form of plungers movable radially in guides 33 that communicate, as clearly appears in Fig. 4, with an annular pressure chamber 34 provided in the housing 17. These plungers frictionally engage the flange 31 to effect a braking action similarly as the brake shoes on the periphery of a car wheel. The chamber 34 will be kept filled with oil or other working fluid, and, when braking action is desired, the oil in the chamber 34 will be placed under sufficient pressure by any suitable means, as, for example, by oil under pressure supplied through the pipe 43 from a suitable source of pressure fluid supply whereby to force the shoes 32 into tight frictional engagement with the flange 31. Since all of the shoes 32 are actuated simultaneously from the same source of pressure fluid, it follows that they all exert the same pressure on the flange 31 and accordingly effect substantially the same braking action. The pressure source communicating with pipe 43 may be a pump drawing oil from the sump 35 and communicating with the chamber 34 and arranged to be set into operation at will. The torque converter housing 17 is kept filled with oil under pressure by means of a centrifugal pump 36 which is driven with the sleeve 15, as shown, and has an inlet 37 communicating with the sump 35, and an outlet 38 communicating with the inside of the torque converter housing. The pump, by reason of the connection described, is driven rapidly during starting periods. The transmission fluid is, therefore, rapidly delivered to the torque converter with the initial slow acceleration from standstill. Fluid losses from the housing 17 are kept to a minimum by reason of the provision of glands, as at 39 and 40, between the stationary and relatively rotating parts of the torque converter. Other glands 41 and 42 prevent leakage of fluid from the transmission as a whole.

The fluid used in the torque converter 18 is suitable for lubrication of the planetary transmission 8 and it will be observed that the driven shaft 5 is bored longitudinally to conduct fluid under pressure from the torque converter to the spider 11 and thence through radial holes and intersecting holes to the planetary gears 13. The fluid discharged to the planetary gears 13 affords ample lubrication not only for these gears but for the ring gear 7 and sun gear 14 as well since they mesh with the planetary gears. The pilot bearing 9 being at one end of the longitudinal bore in the shaft 5 is lubricated directly from said bore through a radial hole, as shown. In like manner, the front bearing 16 is lubricated directly from the bore in the shaft. Obviously, this fluid ultimately finds its way into the sump 35 and is, therefore, used over and over again inasmuch as the pump 36 has its inlet 37 communicating with the sump, as shown. The bearings 25 and 26 are lubricated directly by fluid from the torque converter, these bearings being disposed on opposite sides of the ports provided in the turbine wheel 22 through which fluid is delivered to the longitudinal bore in the shaft 5 for lubrication of the planetary gearing. The rear bearing 16 receives its lubrication directly from the torque converter, it being in open communication to the side of the impeller.

It is believed the foregoing description conveys a good understanding of the objects and advantages of my invention. The appended claims have been drawn with a view to covering all legitimate modifications and adaptations.

I claim:

1. A differential transmission comprising in combination with driving or driven elements, a turbine ring type torque converter, comprising at least a pump impeller, a turbine wheel, and a stationary reaction element, and a planetary type transmission mechanism, comprising a ring gear driven by the driving element, a sun gear driving the pump impeller, and planetary gears between the ring gear and sun gear, said turbine wheel being mounted on and drawing the driven element.

2. In a mechanical-hydraulic transmission, the combination of driving and driven elements, a planetary type transmission mechanism having a ring gear connected to turn with the driving element, palnetary gears connected to revolve with and transmit torque to the driven element, and a sun gear, the sun gear of said mechanism being independent of the driving and driven elements, a turbine ring type torque converter comprising rotatable pump impeller and turbine members and cooperating stationary reaction member, the impeller member being connected to be driven by the sun gear, and an overrunning clutch for transmitting torque from the turbine member to the driven element.

3. A transmission as set forth in claim 2, wherein the sun gear is directly connected with the impeller member, and wherein the reaction member has fluid conducting passages formed so as to cause the turbine member to turn in the opposite direction relative to the impeller member.

4. A transmission as set forth in claim 2 including means for resisting turning of the sun gear and impeller member.

5. A transmission comprising a primary and secondary drive working in differential coaction to transmit and convert torque from a driving to a driven element, said primary drive comprising a planetary gear mechanism including a ring gear driven by the driving element, a sun gear, and planetary gears between the ring gear and sun gear on a spider mounted on and driving the driven element, and the secondary drive comprising a turbine ring type torque converter, including a stationary reaction member, a turbine wheel, and a pump impeller, the sun gear being connected to drive the pump impeller of the torque converter and the turbine wheel being mounted on and driving the driven element.

6. A transmission comprising a primary and secondary drive working in differential coaction to transmit and convert torque from a driving to a driven element, said primary drive comprising a planetary gear mechanism, and the secondary drive comprising a turbine ring type torque converter, including a stationary reaction member, one element of the primary drive forming with one element of the secondary drive a floating rotor to provide differential drive, and means for resisting turning of said rotor.

7. A mechanical-hydraulic transmission comprising in combination, a turbine ring type torque converter, including a stationary reaction member and a pump impeller element, and a planetary type transmission mechanism, including a sun gear, ring gear and intermediate planetary gears, the pump impeller element of the torque converter being connected to turn with the sun gear of the planetary transmission and the ring gear constituting a driving element.

8. In a differential transmission, the combination of driving and driven elements, a planetary type transmission mechanism having a ring gear connected to turn with the driving element, planetary gears connected to revolve with and transmit torque to the driven element, and a sun gear, the sun gear of said mechanism being independent of the driving and driven elements, and a turbine ring type torque converter comprising rotatable pump impeller and turbine members and cooperating stationary reaction member, the impeller member being connected to be driven by the sun gear.

9. A transmission as set forth in claim 8, wherein the sun gear is directly connected with the impeller member, and wherein the reaction member has fluid conducting passages formed so as to cause the turbine member to turn in the opposite direction relative to the impeller member.

10. A transmission as set forth in claim 8, including means for resisting turning of the sun gear and impeller member.

11. A differential transmission comprising, in combination, a turbine ring type torque converter comprising at least a pump impeller, a turbine wheel and a stationary reaction member, and a planetary type transmission mechanism comprising planetary gear elements, the pump impeller of the torque converter being connected to turn with a gear element of the planetary transmission, and means for resisting turning of said impeller element.

12. A mechanical-hydraulic transmission comprising, in combination, driving and driven elements, the driven element being arranged under certain conditions to tend to turn faster than the driving element, planetary transmission mechanism comprising a ring gear turning with the driving element, planetary gears connected to revolve with and normally transmit torque to the driven element, and a sun gear independent of the driving and driven elements, a turbine ring type torque converter comprising a stationary reaction member and relatively rotatable pump impeller and turbine elements, the impeller element turning with the sun gear, and the turbine element turning with the driven element, the impeller element under normal conditions of drive from the driving element to the driven element serving to transmit torque to the turbine element by fluid circulation in one direction through the reaction member, said turbine element under other conditions when the driven element turns faster than the driving element being arranged to cause fluid circulation in the opposite direction through the reaction member and impeller element, and braking means for holding the sun gear and impeller element against turning, whereby to effect a braking action upon the driven element.

13. A transmission as set forth in claim 12, including a fluid receiving chamber for effecting operation of the braking means by fluid pressure, said chamber being arranged to be supplied with fluid from a suitable source of pressure fluid supply.

14. In a transmission, the combination of a driving element and a driven element, a planetary transmission mechanism comprising a ring gear turning with the driving element, planetary gears revolving with and transmitting torque to the driven element, and a sun gear independent of the driving and driven elements but in coaxial relation with the latter, a turbine type fluid transmission including a housing and a rotary impeller element therein, a hollow shaft through which the driven element extends, said hollow shaft connecting the sun gear and impeller element to rotate together, said fluid transmission housing containing fluid adapted to be circulated by the impeller, and a replenishing pump including an impeller mounted on the hollow shaft in coaxial relation with the sun gear rotating with the sun gear and the fluid transmission impeller element and arranged to deliver fluid from a source of fluid supply to the fluid transmission housing.

15. In a mechanical-hydraulic transmission, the combination of a driving element, a driven element, planetary transmission mechanism comprising planetary gears carried on a spider turning with the driven element, a sun gear meshing with the planetary gears and independent of the driving and driven elements, and a ring gear element meshing with the planetary gears and turning with the driving element, said ring gear element enclosing the aforesaid spider and planetary gears, and a turbine ring type torque converter including a stationary reaction member and a pump impeller element, the pump impeller element being connected to turn with the sun gear of the planetary transmission.

16. In combination, a driving element turning with a prime mover, a driven element, a turbine ring type torque converter connected to transmit torque to the driven element, and planetary gearing axially disposed between said torque converter and the driving element, said planetary transmission including a ring gear driven by the driving element, planetary gears carried on a spider directly connected with the driven element, and a sun gear connected with the torque converter.

17. A transmission as set forth in claim 8, wherein the sun gear is directly connected with the impeller member, and wherein the reaction member has fluid conducting passages formed so as to cause the turbine member to turn in the opposite direction relative to the impeller member, the transmission including an overrunning clutch for transmitting drive from the turbine member to the driven element only in the same direction as the planetary gear revolves.

18. A transmission as set forth in claim 8 including an overrunning clutch for transmitting drive from the turbine member to the driven element only in the same direction as the planetary gear revolves.

19. A transmission as set forth in claim 8 including an overrunning clutch for transmitting drive from the turbine member to the driven element only in the same direction as the planetary gear revolves, and means for resisting turning of the sun gear and impeller member.

20. In a differential transmission, the combination of first and second shafts, one of said shafts being a driving element and the other of said shafts being a driven element, a planetary type transmission mechanism having a ring gear connected to turn with the first shaft, planetary gears connected to revolve with the second shaft, and a sun gear, the sun gear of said mechanism being independent of the first and second shafts, a turbine ring type torque converter comprising rotatable bladed wheels, and a cooperating stationary bladed reaction member, one of said wheels being a pump impeller and the other a turbine member, one of the bladed wheels being connected to turn with the sun gear, and means for resisting turning of the sun gear and associated bladed wheel.

21. In a differential transmission, the combination of first and second shafts, one of said shafts being a driving element and the other of said shafts being a driven element, a planetary type transmission mechanism having a ring gear connected to turn with the first shaft, planetary gears connected to revolve with the second shaft, and a sun gear, the sun gear of said mechanism being independent of the first and second shafts, a turbine ring type torque converter comprising rotatable bladed wheels, and a cooperating stationary bladed reaction member, one of said wheels being a pump impeller and the other a turbine member, one of the bladed wheels being connected to turn with the sun gear, the sun gear being directly connected with the said one bladed wheel and the reaction member having fluid conducting passages formed so as to cause the bladed wheels to turn in opposite directions, and an over-running clutch for detachably connecting the other bladed wheel with the second shaft.

22. In a differential transmission, the combination of first and second shafts, one of said shafts being a driving element and the other of said shafts being a driven element, a planetary type transmission mechanism having a ring gear connected to turn with the first shaft, planetary gears connected to revolve with the second shaft, and a sun gear, the sun gear of said mechanism being independent of the first and second shafts, a turbine ring type torque converter comprising rotatable bladed wheels, and a cooperating stationary bladed reaction member, one of said wheels being a pump impeller and the other a turbine member, one of the bladed wheels being connected to turn with the sun gear, and an overrunning clutch for detachably connecting the other bladed wheel with the second shaft.

23. In a differential transmission, the combination of first and second shafts, one of said shafts being a driving element and the other of said shafts being a driven element, a planetary type transmission mechanism having a ring gear connected to turn with the first shaft, planetary gears connected to revolve with the second shaft, and a sun gear, the sun gear of said mechanism being independent of the first and second shafts, a turbine ring type torque converter comprising rotatable bladed wheels, and a cooperating stationary bladed reaction member, one of said wheels being a pump impeller and the other a turbine member, one of the bladed wheels being connected to turn with the sun gear, an overrunning clutch for detachably connecting the other bladed wheel with the second shaft, and means for resisting turning of the sun gear and associated bladed wheel.

24. In a mechanical hydraulic transmission, the combination of first and second shafts, one of said shafts being a driving element and the other of said shafts being a driven element, planetary transmission mechanism comprising planetary gears carried on a spider turning with the first shaft, a sun gear meshing with the planetary gears and independent of said shafts, and a ring gear element meshing with the planetary gears and turning with the second shaft, said ring gear element enclosing the aforesaid spider and planetary gears, and a turbine ring type torque converter including a stationary reaction member and cooperating bladed wheels, one of which is a pump impeller and the other a turbine wheel, one of said bladed wheels being connected to turn with the sun gear of the planetary transmission.

25. A differential transmission comprising in combination, a turbine ring type torque converter comprising at least a pump impeller, a turbine wheel, and a stationary reaction element, and a planetary type transmission mechanism comprising planetary gear elements, the pump impeller element of the torque converter being connected to turn with a gear element of the planetary transmission, and the stationary reaction member of the torque converter comprising blades formed so as to circulate fluid from the impeller element to the turbine wheel in such a direction to cause the turbine wheel to turn in the opposite direction with relation to the direction of rotation of the impeller element.

26. In a differential transmission, the combination of first and second shafts, one of said shafts being a driving element and the other of said shafts being a driven element, a planetary type transmission mechanism having a ring gear connected to turn with the first shaft, planetary gears connected to revolve with the second shaft, and a sun gear, the sun gear of said mechanism being independent of the first and second shafts, a turbine ring type torque converter comprising rotatable bladed wheels, and a cooperating stationary bladed reaction member, one of said wheels being a pump impeller and the other a turbine member, one of the bladed wheels being connected to turn with the sun gear, the sun gear being directly connected with the bladed wheel, and the reaction member having fluid conducting passages formed so as to cause the bladed wheels to turn in opposite directions.

HEINRICH SCHNEIDER.

CERTIFICATE OF CORRECTION.

Patent No. 2,176,105.   October 17, 1939.

HEINRICH SCHNEIDER.

It is hereby certified that error appears in the printed specification of the above numbered patent requiring correction as follows: Page 3, first column, line 30, claim 1, for the word "or" read and; line 38, same claim, for "drawing" read driving; line 44, claim 2, for "palnetary" read planetary; and that the said Letters Patent should be read with this correction therein that the same may conform to the record of the case in the Patent Office.

Signed and sealed this 21st day of November, A. D. 1939.

Henry Van Arsdale,
Acting Commissioner of Patents.

(Seal)

wheels being a pump impeller and the other a turbine member, one of the bladed wheels being connected to turn with the sun gear, an overrunning clutch for detachably connecting the other bladed wheel with the second shaft, and means for resisting turning of the sun gear and associated bladed wheel.

24. In a mechanical hydraulic transmission, the combination of first and second shafts, one of said shafts being a driving element and the other of said shafts being a driven element, planetary transmission mechanism comprising planetary gears carried on a spider turning with the first shaft, a sun gear meshing with the planetary gears and independent of said shafts, and a ring gear element meshing with the planetary gears and turning with the second shaft, said ring gear element enclosing the aforesaid spider and planetary gears, and a turbine ring type torque converter including a stationary reaction member and cooperating bladed wheels, one of which is a pump impeller and the other a turbine wheel, one of said bladed wheels being connected to turn with the sun gear of the planetary transmission.

25. A differential transmission comprising in combination, a turbine ring type torque converter comprising at least a pump impeller, a turbine wheel, and a stationary reaction element, and a planetary type transmission mechanism comprising planetary gear elements, the pump impeller element of the torque converter being connected to turn with a gear element of the planetary transmission, and the stationary reaction member of the torque converter comprising blades formed so as to circulate fluid from the impeller element to the turbine wheel in such a direction to cause the turbine wheel to turn in the opposite direction with relation to the direction of rotation of the impeller element.

26. In a differential transmission, the combination of first and second shafts, one of said shafts being a driving element and the other of said shafts being a driven element, a planetary type transmission mechanism having a ring gear connected to turn with the first shaft, planetary gears connected to revolve with the second shaft, and a sun gear, the sun gear of said mechanism being independent of the first and second shafts, a turbine ring type torque converter comprising rotatable bladed wheels, and a cooperating stationary bladed reaction member, one of said wheels being a pump impeller and the other a turbine member, one of the bladed wheels being connected to turn with the sun gear, the sun gear being directly connected with the bladed wheel, and the reaction member having fluid conducting passages formed so as to cause the bladed wheels to turn in opposite directions.

HEINRICH SCHNEIDER.

CERTIFICATE OF CORRECTION.

Patent No. 2,176,105.   October 17, 1939.

HEINRICH SCHNEIDER.

It is hereby certified that error appears in the printed specification of the above numbered patent requiring correction as follows: Page 3, first column, line 30, claim 1, for the word "or" read and; line 38, same claim, for "drawing" read driving; line 44, claim 2, for "palnetary" read planetary; and that the said Letters Patent should be read with this correction therein that the same may conform to the record of the case in the Patent Office.

Signed and sealed this 21st day of November, A. D. 1939.

Henry Van Arsdale,
Acting Commissioner of Patents.

(Seal)